United States Patent [19]

Boyd et al.

[11] Patent Number: 5,070,717

[45] Date of Patent: Dec. 10, 1991

[54] METHOD OF FORMING A TUBULAR MEMBER WITH FLANGE

[75] Inventors: David B. Boyd, Sterling Heights; Charles J. Cueny, Utica, both of Mich.

[73] Assignee: General Motors Corporation, Detroit, Mich.

[21] Appl. No.: 643,403

[22] Filed: Jan. 22, 1991

[51] Int. Cl.$^5$ .............................................. B21D 26/02
[52] U.S. Cl. ........................................ 72/55; 72/57; 72/58; 72/367; 29/421.1
[58] Field of Search .................. 72/56, 57, 58, 61, 62, 72/367, 369, 55; 29/421.1

[56] References Cited

U.S. PATENT DOCUMENTS

| | | | |
|---|---|---|---|
| 3,220,098 | 11/1965 | Arbogast | 72/57 |
| 3,611,768 | 10/1971 | Odagaki | 72/58 |
| 3,807,009 | 4/1974 | Ostbo | 29/421.1 |
| 4,454,745 | 6/1984 | Cudini | 72/370 |
| 4,567,743 | 2/1986 | Cudini | 72/61 |
| 4,744,237 | 5/1988 | Cudini | 72/367 |
| 4,759,111 | 7/1988 | Cudini | 29/523 |
| 4,776,196 | 10/1988 | Cudini | 72/316 |
| 4,829,803 | 5/1969 | Cudini | 72/367 |
| 4,840,053 | 6/1989 | Nakamura | 72/58 |
| 4,945,682 | 8/1990 | Altman et al. | 49/502 |

FOREIGN PATENT DOCUMENTS 1245215 9/1971 United Kingdom .................. 76/61

OTHER PUBLICATIONS

"Molding by Rubber Liquid", Russian Language, E. I. Isachenkov, 1967, 317–321.

Primary Examiner—David Jones
Attorney, Agent, or Firm—Charles E. Leahy

[57] ABSTRACT

The method of forming a flanged tubular member is accomplished by sizing the tubular blank to the largest cross section circumferential measure of the desired end product and then using a hydro-forming die and process to expand any excess circumferential measure into a flange defining portion of the die cavity to thereby enable the formation of a cross section of lesser cross sectional circumferential measure than the largest cross section. The flange maybe trimmed as desired to shorten the length of the flange, in which case, welding or other suitable attachment process may be employed to join the flanges together to strengthen the tubular member.

5 Claims, 3 Drawing Sheets

METHOD OF FORMING A TUBULAR MEMBER WITH FLANGE

The invention relates to forming a shaped tubular member and more particularly provides a tubular member having a flange.

BACKGROUND OF THE INVENTION

It is known to form the cross sectional profile of a tubular member by a hydro-forming process in which a fluid filled tubular blank is placed within a die and then the die is closed so that the tubular blank is pinched within the die. Fluid pressure is then increased inside the tubular member to expand the blank outwardly against the die cavity to provide a tubular product having a die formed cross sectional profile. The tubular product may have different cross sectional profiles along the length thereof.

A disadvantage of the aforedescribed method of forming a tubular member resides in the fact that the circumferential measure of the cross section must be of generally the same dimension all along the length of the tubular member. The prior art has recognized that the circumferential expansion of the blank is limited to about two to five percent when using readily available grades of tubular steel. Expansions of circumference of up to about 20 percent can be performed if the tubular blank is of fully annealed tubular steel. This limitation in the extent of permissible expansion, limits the potential for forming tubular members having differing cross sectional circumferential measure along the length of the tubular member.

It would be desirable to provide a forming method which would enable the manufacture of a tubular member which would have substantially different cross section circumferential measure along the length of the tubular member.

The aforedescribed tubular members are particularly useful in the manufacture of vehicle bodies. For example, in U.S. Pat. No. 4,945,682 it is shown that such a tubular member may be employed to reinforce a vehicle door molded of synthetic resin. In many vehicle structures, such as doors, it would be desirable to provide such a tubular member with a flange to facilitate the attachment thereto of weather strips or other vehicle body components.

Therefore it would be desirable to provide a method of forming an integral flange on a hydro-formed tubular member.

SUMMARY OF THE INVENTION

According to the invention, the method of forming a flanged tubular member is accomplished by sizing the tubular blank to the largest cross section circumferential measure of the desired end product and then using a hydro-forming die and process to expand any excess circumferential measure into a flange defining portion of the die cavity to thereby enable the formation of a cross section of lesser cross sectional circumferential measure than the largest cross section. The flange maybe trimmed as desired to shorten the length of the flange, in which case, welding or other suitable attachment process may be employed to join the flanges together to strengthen the tubular member.

In particular, the method comprises the steps of:
providing a tubular blank having a cross sectional circumferential measure;
positioning the blank between open die halves mating with one another to define a tubular cross section portion having a height substantially equal to twice the wall thickness of the tubular blank and a flange cavity portion;
applying at least nominal internal hydraulic pressure to the blank;
progressively closing the die halves to progressively deform the tubular member within the tubular cavity portion and progressively expel the tubular member into the flange cavity portion to define a flange comprised of wall portions of the tubular member engaging one another;
increasing the hydraulic pressure to expand and conform the tubular member to the tubular cavity portion;
separating the die halves;
and removing the blank from the die.

BRIEF DESCRIPTION OF THE DRAWINGS

These and other features, objects and advantages of the invention will become apparent upon consideration of the description of the preferred embodiment and the appended drawings in which.

DESCRIPTION OF THE PREFERRED EMBODIMENT

Figure 1:
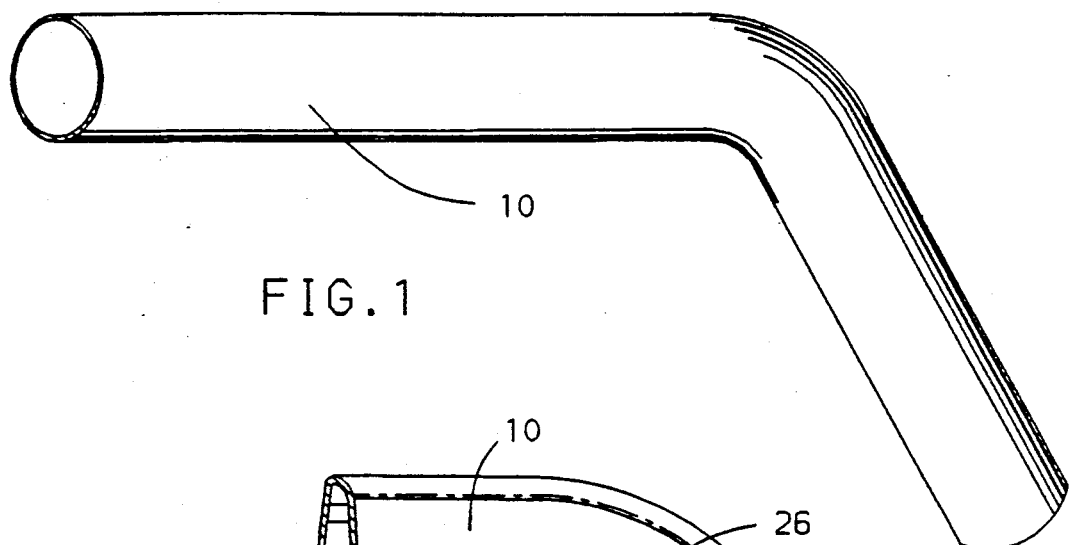
FIG. 1 shows a tubular blank which has been bent to the desired shape of the finished product.

Referring to FIG. 1 there is shown a tubular blank 10 of circular cross section which has been bent into a L-shape through a suitable bending process such as mandrel bending or stretch bending.

Figure 2:
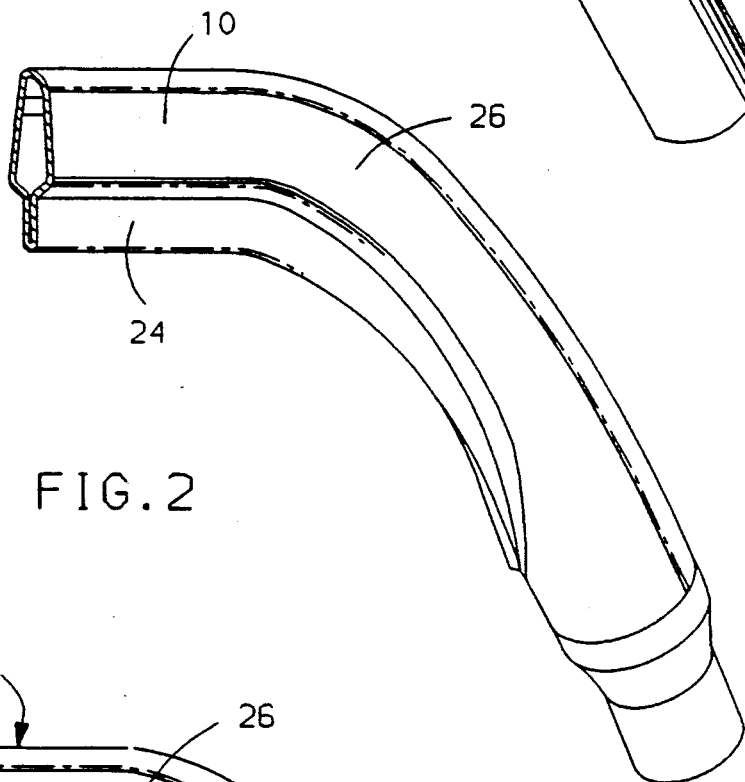
FIG. 2 shows the tubular member hydro-formed to a desired cross section and having a flange extending along at least a portion of the length thereof.
Figure 3:
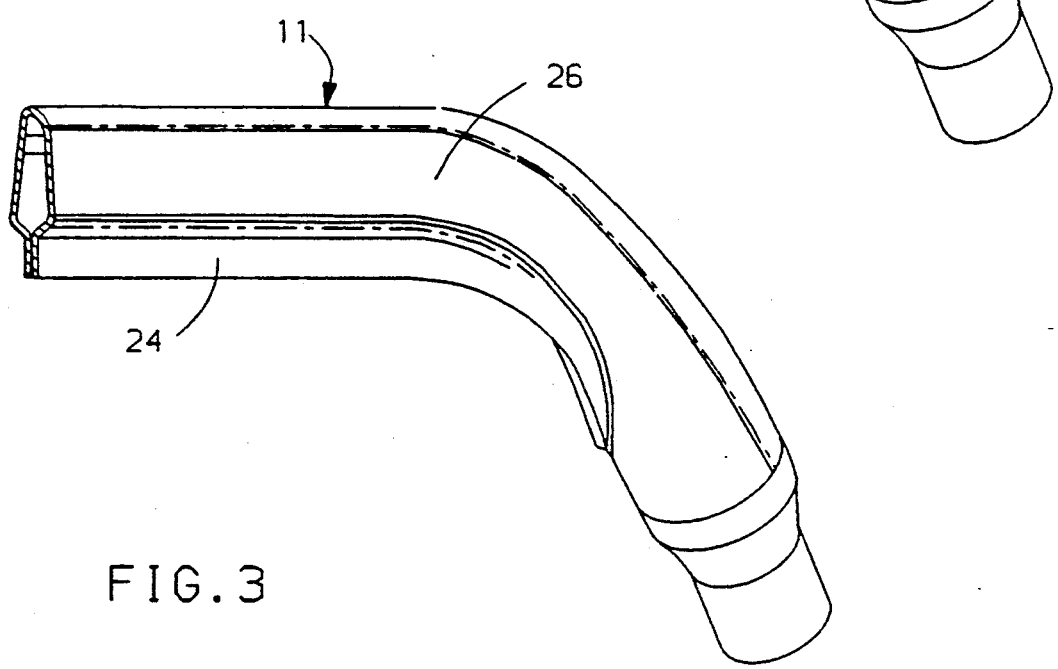
FIG. 3 shows the finished article with the flange having been trimmed back to a desired length.

FIG. 2 shows an intermediate step in the forming of a tubular member from the blank 10 and FIG. 3 shows the finished tubular member 11 manufactured according to the steps shown in FIGS. 4–11 and described hereinafter.

Figure 4:
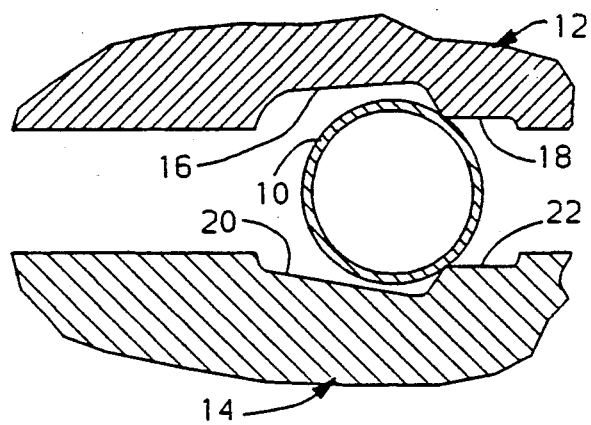
FIG. 4 is a cross sectional view of the tubular blank of FIG. 1 placed between the halves of a die set.

As shown in FIG. 4 the blank 10 of FIG. 1 is placed in a die set comprised of upper die half 12 and lower die half 14. The upper die 12 includes a tubular forming cavity portion 16 and a flange forming cavity portion 18. Likewise, the lower die 14 has a tubular forming cavity portion 20 and a flange forming cavity portion 22. It will be understood that the combined cross sectional circumferential measure of the tubular forming cavity portions 16 and 20 and the length of the flange forming cavity portions 18 and 22 total up to generally equal to or slightly greater than the cross section perimeter length of the blank 10.

Figure 5:
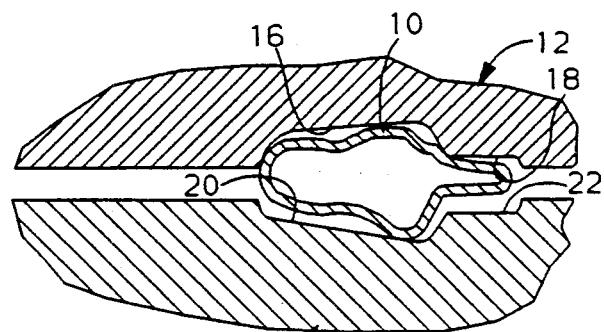
FIG. 5 is a view showing partial closing of the die set so that the fluid pressure trapped within the tubular member forces excess metal into flange forming portion of the dies.

The ends of the tubular blank 10 are sealed and hydraulic fluid is pumped into the tubular blank 10 under pressure. The upper die half 12 and lower die half 14 are progressively closed as shown in FIG. 5 so that the blank 10 is progressively flattened and the pressurized fluid captured therein expands the walls of the tubular blank 10 into the cavities of the die. In particular, as seen in FIG. 5, the tubular blank 10 is expelled and forced to migrate laterally into the flange forming cavity portions 18 and 22.

Figure 6:
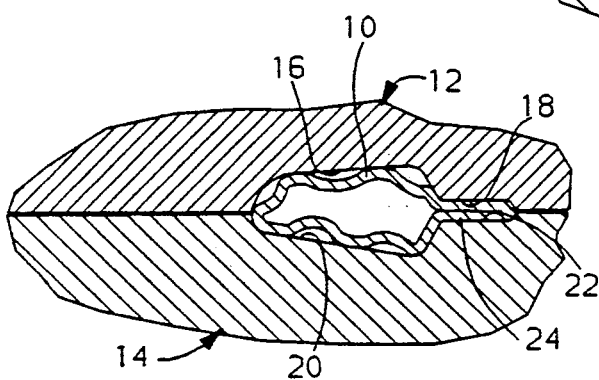
FIG. 6 is a view showing the die set having been completely closed with the fluid pressure having displaced wall portion to define a flange and showing the remaining wall having been irregularly impressed within the remaining cavity of the die set.

As seen in FIG. 6, the die halves 12 and 14 are fully closed upon one another with the tubular blank being tightly clamped between the die halves 12 and 14 to define a flange structure 24, the remainder of the tubular blank 10 having been irregularly bowed or dished inwardly. During this closing of the die halves as shown in FIGS. 4, 5, and 6, a relatively constant hydraulic pressure may be maintained within the tubular blank by incorporating a pressure relief valve into the seal enclosing the ends of the tubular blank 10 so that hydraulic fluid may be forced from the tubular blank 10 as it collapses. As best seen in FIG. 6, the combined height of the flange forming cavity portions 18 and 22 is equal to twice the wall thickness of the tubular blank 10 so that the walls of the tubular blank 10 forming the flange structure 24 engage with one another.

Figure 7:
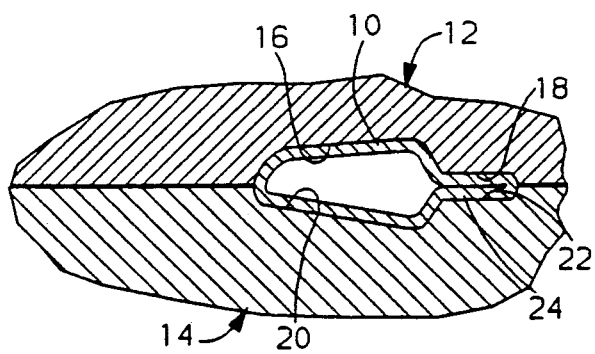
FIG. 7 shows the tubular member having been expanded and conformed to the shape of the die cavity by hydraulic pressure applied within the tubular member.

Once the die is closed, the blank tube 10 is then expanded to the final cross sectional profile of FIG. 7 by increasing the hydraulic pressure sufficient to exceed the yield limit of the tubular blank 10 so that the tubular blank 10 is forced into conformity with the tubular forming cavity portions 16 and 20 of the die halves.

Figure 8:
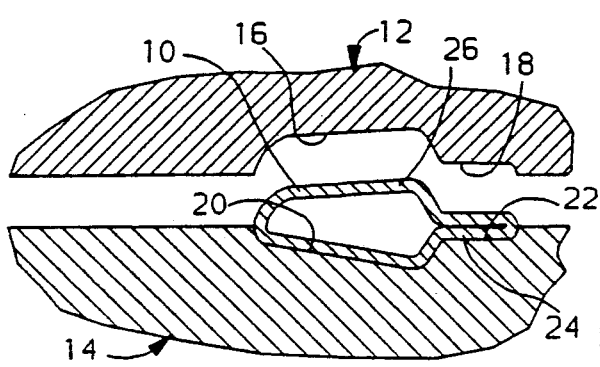
FIG. 8 shows the die set opened to permit removal of the tubular member therefrom.

FIG. 8 shows the die halves being opened to permit removal of the formed tube from the dies.

FIGS. 4 through 8 show a particular cross section through the tubular member, it being understood that differing cross sections may be provided at different points along the length of the tube. For example, as shown in FIG. 2, the tubular member 26 may have the tubular portion thereof gradually increasing in dimension while the flange 24 of the tube member 26 progressively diminishes in dimension. In this respect it will be understood that the dies are designed to provide the desired cross sectional tubular shape with any remaining unused wall portion of the tube then relegated to being displaced into the flange portion of the tubular member.

Subsequent to forming the product to the condition shown in FIG. 3, it will understood that additional manufacturing processes may be applied, for example flanging or shaping the ends of the tubes as desired within the teachings of the prior art.

Figure 9:
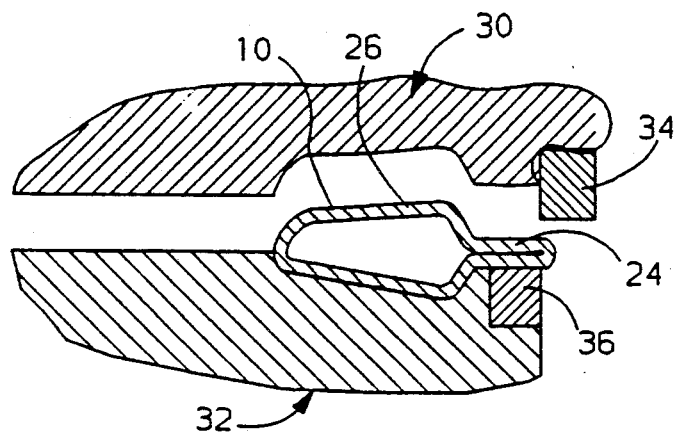
FIG. 9 shows the finished tubular member placed in a trimming die.
Figure 10:
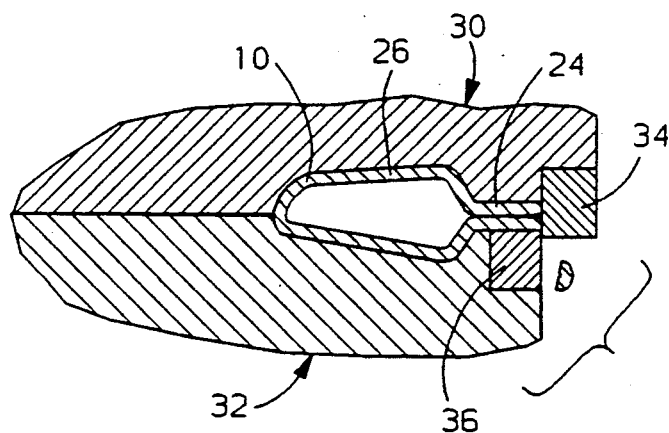
FIG. 10 shows the trimming die closed to trim the flange.
Figure 11:
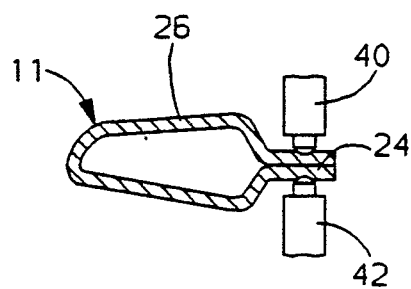
FIG. 11 shows the welding together of the flanges by a resistance spot welder.

The finished tubular member 26 may be assembled into a vehicle body with the flange 24 employed to mount a weather strip or some other desired vehicle component. FIGS. 9, 10 and 11 show that any excess part of the flange 24 can be trimmed from the tubular member 26. In particular, FIG. 10 shows the formed tubular member 26 of FIG. 8 placed in a trim die comprised of an upper die half 30 and a lower die half 32. The upper half carries a suitably hardened shear insert 34 which is aligned to precisely overlap a shear block 36 mounted on the lower die half 32.

Accordingly, as the die halves 30 and 32 are closed relative one another, the shear insert 34 cuts away the portion of the flange 24 which overhangs the shear block 36.

FIG. 11 shows spot welding electrodes 40 and 42 which apply a spot weld between the walls of flange 24 to strengthen and rigidify the tubular member 26. It will be understood that other welding or suitable attaching methods may be employed to join wall of the flange 24 together.

Thus it is seen that the tubular member may be manufactured to include an integral flange, and furthermore the tubular member may have cross sections of differing circumferential measure with the excess material pushed into the flange portion of the tubular member. In addition, the flange portion may be trimmed to desired length.

Therefore in designing the die cavity for use in practicing the aforedescribed method, it will be understood that the total circumferential measure of the die cavity will remain constant and that the shape of the cross section will be varied along the length of the tubular member by varying the proportion of wall circumferential devoted to forming the tubular portion and the flange portion. For example, if it is desired to provide a larger tubular portion, the length of the flange forming portion is correspondingly reduced. In particular, it will be noted that the length of the flange structure will be generally half the difference between the cross sectional circumferential measure of the tubular blank 10 as measured before the forming operation has begun, and the cross sectional circumferential measure of the tubular portion which is desired to be obtained at that particular point along the length of the tubular member.

Accordingly by applying the above described method it will be appreciated that the circumferential measure of a deformed tubular member may have substantially greater variations in cross section along the length than permitted by the prior art.

The embodiments of the invention in which an exclusive property or privilege is claimed we defined as follows:

1. Method of forming a flanged tubular member comprising the steps of:
   providing a tubular blank having a cross sectional circumferential measure;
   positioning the blank between open die halves mating with one another to define a tubular cross section portion and a flange cavity portion having a height substantially equal to twice the wall thickness of the tubular blank;
   applying at least nominal internal hydraulic pressure to the blank;
   progressively closing the die halves to progressively deform the tubular member within the tubular cavity portion and progressively expel the tubular member into the flange cavity portion to define a flange comprised of wall portions of the tubular member engaging one another;
   increasing the hydraulic pressure to expand and conform the tubular member to the tubular cavity portion;
   separating the die halves;
   and removing the blank from the die.

2. The method of claim 1 comprising the further step of trimming the flange.

3. The method of claim 2 comprising the further step of welding together the wall portions defining the trimmed flange.

4. A method of forming a tubular member having differing cross sections along the length thereof and differing circumferential measure at said differing cross sections, comprising the steps of:

providing a tubular blank having a uniform cross sectional circumferential measure;

positioning the blank between open die halves each having a tubular cavity portion mating with the other to define a tubular cross section of the desired differing cross section and each having a flange cavity portion mating with the other to define a cross section of generally twice the wall thickness of the blank and length equal to half the difference between the cross sectional circumferential measure of the blank and the cross sectional circumferential measure of the desired differing cross section at that point along the length of the tubular member;

applying at least nominal internal hydraulic pressure to the blank;

progressively closing the die halves to progressively deform the tubular member within the tubular cavity portion and progressively expel the perimeter wall portion of the tubular member into the flange cavity portion to thereby define the flange;

increasing the hydraulic pressure to expand and conform the tubular member to the tubular cavity portion to thereby define the desired differing cross sections;

separating the die halves;

removing the blank from the die;

and trimming the flange as desired.

5. The method of claim 4 comprising the further step of welding together the wall portions defining the trimmed flange.

* * * * *